(12) United States Patent
Ledieu et al.

(10) Patent No.: US 9,902,209 B2
(45) Date of Patent: Feb. 27, 2018

(54) TIRE TREAD WITH DIRECTIONAL DESIGN

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Vincent Ledieu, Clermont-ferrand (FR); Bertrand Fraenkel, Clermont-ferrand (FR); Illyes Batnini, Clermont-ferrand (FR); Marie-Helene Vantal, Clermont-Ferrand (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 250 days.

(21) Appl. No.: 14/648,388

(22) PCT Filed: Nov. 22, 2013

(86) PCT No.: PCT/EP2013/074431
§ 371 (c)(1),
(2) Date: May 29, 2015

(87) PCT Pub. No.: WO2014/082923
PCT Pub. Date: Jun. 5, 2014

(65) Prior Publication Data
US 2015/0298507 A1    Oct. 22, 2015

(30) Foreign Application Priority Data

Nov. 29, 2012 (FR) ...................... 12 61418

(51) Int. Cl.
B60C 11/03 (2006.01)
B60C 11/12 (2006.01)
B60C 11/13 (2006.01)

(52) U.S. Cl.
CPC ...... B60C 11/1204 (2013.01); B60C 11/0302 (2013.01); B60C 11/0323 (2013.01);
(Continued)

(58) Field of Classification Search
CPC ............. B60C 11/0302; B60C 11/0323; B60C 11/1281; B60C 2011/0381
See application file for complete search history.

(56) References Cited

U.S. PATENT DOCUMENTS 4,986,325 A * 1/1991 Matsumoto ......... B60C 11/0302
152/209.17
6,408,910 B1 6/2002 Lagnier et al.
(Continued)

FOREIGN PATENT DOCUMENTS

EP    2230101    9/2010
EP    2332745    6/2011
(Continued)

OTHER PUBLICATIONS

Machine translation for Japan 2008-260438 (no date).*
(Continued)

*Primary Examiner* — Steven D Maki
(74) *Attorney, Agent, or Firm* — Dickinson Wright, PLLC

(57) ABSTRACT

A tread having a plurality of grooves formed on each half of the tread on each side of a midplane X-X', each opening axially to the outside and extending axially towards the midplane X-X' so that the plurality of grooves forms a first pattern in the overall shape of a V pointing in a groove direction Xr. The tread includes a plurality of sipes. From a certain degree of wear onwards, all or some of the sipes
(Continued)

become enlarged forming cavities extending in an oblique direction forming a second pattern in the overall shape of a V pointing in a cavity direction Xc. Each of these cavities opens into just one of the grooves of the tread, the plurality of grooves forming, at this level of wear, the same first pattern.

4 Claims, 4 Drawing Sheets

(52) U.S. Cl.
CPC .......... *B60C 11/12* (2013.01); *B60C 11/1281* (2013.01); *B60C 11/13* (2013.01); *B60C 2011/0374* (2013.01); *B60C 2011/0381* (2013.01); *B60C 2011/1209* (2013.01)

(56) References Cited

U.S. PATENT DOCUMENTS

| | | | |
|---|---|---|---|
| 2010/0175799 A1* | 7/2010 | Takahashi | B60C 11/0309 152/209.3 |
| 2011/0017374 A1* | 1/2011 | Bervas | B60C 11/0306 152/209.18 |
| 2011/0067794 A1* | 3/2011 | Endou | B60C 11/0302 152/209.18 |
| 2011/0073230 A1* | 3/2011 | Ishiguro | B60C 11/0302 152/209.18 |
| 2011/0220258 A1 | 9/2011 | Taniguchi | |

FOREIGN PATENT DOCUMENTS

| | | |
|---|---|---|
| FR | 2763892 | 12/1998 |
| GB | 2329161 A * | 3/1999 |
| JP | S61160303 | 7/1986 |
| JP | 08-048115 A * | 2/1996 |
| JP | 2005153655 | 6/2005 |
| JP | 2008-260438 A * | 10/2008 |
| JP | 2008260348 | 4/2015 |
| WO | 9917943 | 4/1999 |
| WO | WO-99/17943 A1 * | 4/1999 |

OTHER PUBLICATIONS

Machine translation for Japan 08-048115 (no date).*
International Search Report for PCT/EP2013/074431 dated Mar. 1, 2014.
French Search Report for FR1261418 dated Jun. 21, 2013.

* cited by examiner

TIRE TREAD WITH DIRECTIONAL DESIGN

This application is a 371 national phase entry of PCT/EP2013/074431, filed 22 Nov. 2013, which claims benefit of French Patent Application No. 1261418, filed 29 Nov. 2012, the entire contents of which are incorporated herein by reference for all purposes.

BACKGROUND

Field

The present disclosure relates to a tread for a tire intended to be fitted to a passenger vehicle. More particularly, the disclosure relates to a tire that has improved performance for winter driving or driving in the wet.

Description of Related Art

Document U.S. Pat. No. 4,057,089 discloses a tread comprising a directional pattern. The "pattern" of a tread means a plurality of cuts made in this tread to a predetermined design, these cuts having a suitable width and depth. A cut generically refers either to a groove or to a sipe and corresponds to the space delimited by the walls of material facing one another and distant from one another by a non-zero distance. What differentiates a sipe from a groove is specifically this distance; in the case of a sipe, this distance is suited to allowing the opposite walls delimiting the sipe to come at least partially into contact as the sipe end of the contact patch in which the tire is in contact with the ground. In the case of a groove, the walls of this groove cannot come into contact with one another under usual running conditions.

The directional tread pattern of document U.S. Pat. No. 4,057,089 thus has a series of V-shaped grooves all pointing in the same direction all around the tread of the tire. With such a shape of tread pattern, the water is removed via the sides of the tire, improving the drainage of the contact patch in which the tire is in contact with the wet road surface and therefore improving the grip of this tire on this road surface.

Document EP0721853 discloses a directional tread pattern comprising, in addition to V-shaped grooves pointing all in the same direction, a plurality of sipes likewise all pointing in a common direction, this common direction being the opposite to the direction of the grooves. With such a configuration of tread pattern the rigidity of the tread pattern is decreased and the grip performance of the tire on a snowy road surface is improved.

With tread wear, the heights of the grooves decrease and this decreases their ability to drain water away from the contact patch. Furthermore, with this wear, the tread becomes more rigid overall. The grip performance of the tire on a wet road surface and on a snowy road surface is therefore decreased with tread wear.

The invention, in an embodiment, proposes a solution for limiting these drops in grip as the tire wears.

Definitions

A "tire" means all types of resilient tread whether or not it is subjected to an internal pressure.

The "tread" of a tire means a quantity of rubber material delimited by lateral surfaces and by two principal surfaces, one of which is intended to come into contact with a road surface when the tire is being driven on.

The "tread surface" of a tread here means the collection of points on the tread which come into contact with the ground when the tire, inflated to its reference pressure, is driving along this ground. The reference inflation pressure is defined under the conditions of use of the tire, which conditions are specified notably by the ETRTO standard.

The "axial direction" means a direction parallel to the axis of rotation of the tire.

The "radial direction" means a direction which is perpendicular to the axis of rotation of the tire (this direction corresponds to the direction of the thickness of the tread).

A "circumferential direction" means a direction which is tangential to any circle centred on the axis of rotation. This direction is perpendicular both to the axial direction and to the radial direction.

An "oblique direction" means a direction that has both a circumferential component and an axial component.

The "degree of wear" of the tread means the ratio between a thickness that the tread has lost through wear and the total thickness that the tread can lose before it has to be replaced. Thus, a degree of wear of 25% means that the tread has lost one quarter of the wearable rubber material.

SUMMARY

The invention, in an embodiment, relates to a tread comprising a plurality of grooves which are formed on each half of the tread on each side of a midplane. Each of these grooves opens axially to the outside and extends axially towards the midplane so that the plurality of grooves forms on the tread a first pattern in the overall shape of a V pointing in a groove direction. The tread further comprises a plurality of sipes. From a certain degree of wear onwards, all or some of the sipes of this tread become enlarged in order to form cavities, these cavities extending in an oblique direction forming a second pattern in the overall shape of a V pointing in a cavity direction. Each of these cavities opens into just one of the grooves of the tread. The plurality of grooves forms, at this level of wear, the same first pattern.

The invention, in an embodiment, thus proposes to proceed to the generation of cavities extending sipes when the tread reaches a certain level of wear. These cavities form additional edge corners on the tread surface of the tread which will improve its ability to "bite" into the snow and will therefore optimize the grip of this tread on a snowy road surface. Furthermore, these cavities will constitute reservoirs able to store water from a wet road surface. Because these cavities are connected to grooves which open axially to the outside, drainage of water away from the contact patch is also optimized.

In an alternative form of embodiment, the grooves have a predetermined curvature on the tread surface of the tread, each groove delimiting a first wall of material on the inside of the curvature and a second wall of material opposite the first wall of material. The cavity direction is identical to the groove direction and each cavity extends between the first wall of a first groove and the second wall of a second groove adjacent to the first groove. This cavity opens onto the first wall of the first groove. This cavity does not open onto the second wall of the second groove.

By making the cavities open onto the walls of the grooves on the inside of their curvature, good removal of water from the cavities is allowed. This is because since the cavities here point in the same direction as the grooves, the flow of the water out of the cavities, referred to as the secondary flow, will be in the same direction as the flow of water out of the grooves, referred to as the main flow. In this way, the effects of vortices as the secondary flow from the cavities meets the main flow is limited, it being possible for such vortices to disrupt the removal of water from the grooves.

In an alternative form of embodiment, the direction of the cavities is the opposite of the direction of the grooves and, for each cavity, it does not open onto the first wall of the first groove but opens onto the second wall of the second groove.

The Applicant Companies have observed that a drop in rigidity of the first walls of the grooves could lead to a not-insignificant reduction in the ability of these grooves to remove water from the contact patch. Any opening in a first wall can potentially lead to a drop in the rigidity of this wall. By not making the cavities open onto the first walls of the grooves, the rigidity of these first walls of the grooves is thus not reduced.

The cavity delimits a wall respectively facing the first wall of the first groove or the second wall of the second groove. The curvature of this wall is parallel respectively to the curvature of the first wall or of the second wall.

In this way, the length of the edge corners formed by the cavity on the tread surface is optimized and the ability of the tread to "bite" into a snowy road surface when the tire is in a worn state is improved.

In one preferred embodiment, the cavity comprises a principal part of width wp and an intermediate part of width less than the width of the principal part, this intermediate part connecting the principal part of the cavity to a groove.

By proceeding to create a reduction in width at the exit from the cavity, the rate at which water is removed from this cavity is improved.

In one preferred embodiment, that the width of the intermediate part of the cavity decreases progressively from the principal part of this cavity towards the groove.

Because of its reduced width, the intermediate part is subjected to high mechanical stresses when the tire is being driven on. By creating an intermediate part the width of which reduces progressively, the mechanical strength of the tread overall is improved at this intermediate part.

BRIEF DESCRIPTION OF THE DRAWINGS

Other features and advantages of the invention will become apparent from the description which follows, given by way of non-limiting example with reference to the attached drawings in which.

In the description which will follow, elements which are substantially identical or similar will be denoted by identical references.

DETAILED DESCRIPTION OF SPECIFIC EMBODIMENTS

Figure 1:
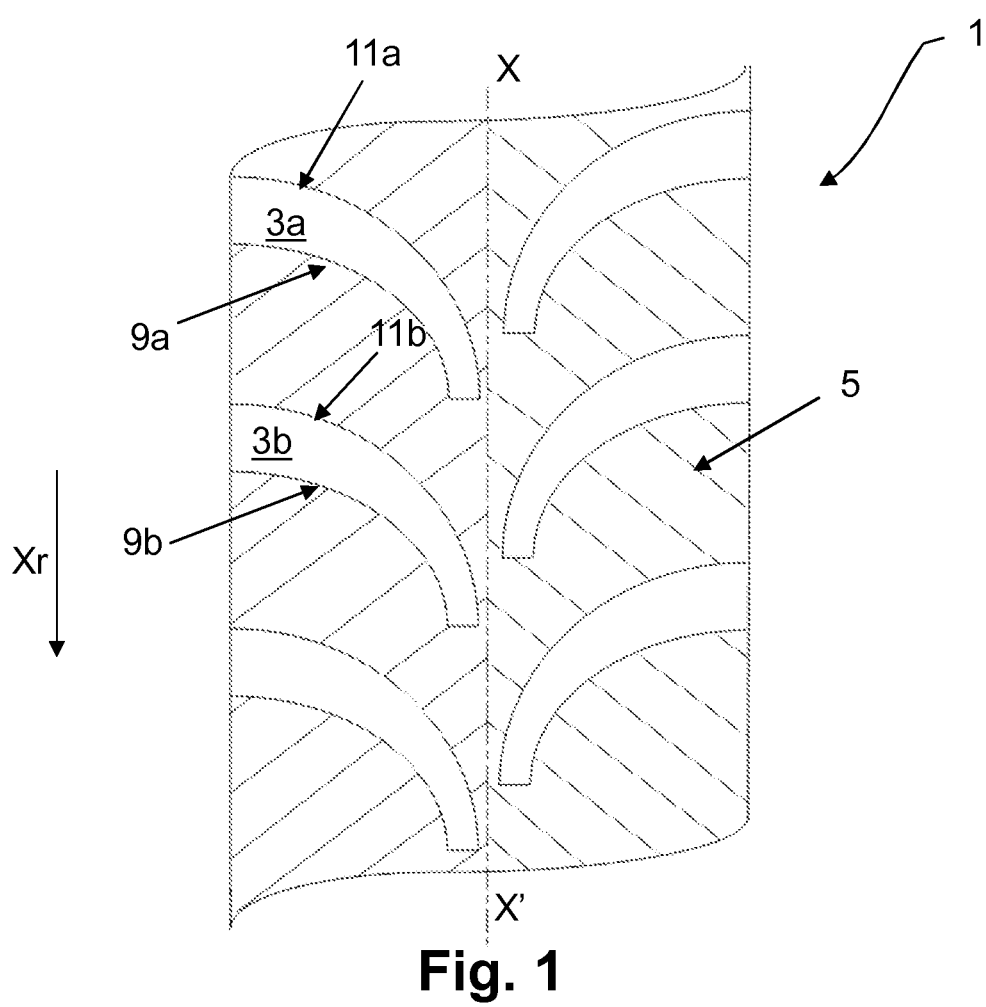
FIG. 1 schematically depicts a tread surface of a tread according to an embodiment of the invention, in the new state.

FIG. 1 schematically depicts a tread surface of a tread 1 in the new state. It is this tread surface that will come into contact with a road surface when a tire which comprises this tread is being driven on.

In more detail, the tread 1 comprises a plurality of grooves 3a, 3b formed on each half of the tread on either side of a midplane X-X'. Each of these grooves opens axially to the outside, namely towards the shoulder parts of the tire (which have not been depicted here) and extend axially towards the midplane X-X' with a predetermined curvature. These grooves 3a, 3b form on the tread a first pattern in the overall shape of a V pointing in a groove direction Xr. More specifically, each groove delimits a first wall of material 9a, 9b on the inside of the curvature of the groove and a second wall of material 11a, 11b opposite the first wall of material. The tread further comprises a plurality of sipes 5. Each of these sipes extends here between two adjacent grooves in an oblique direction.

Figure 2:
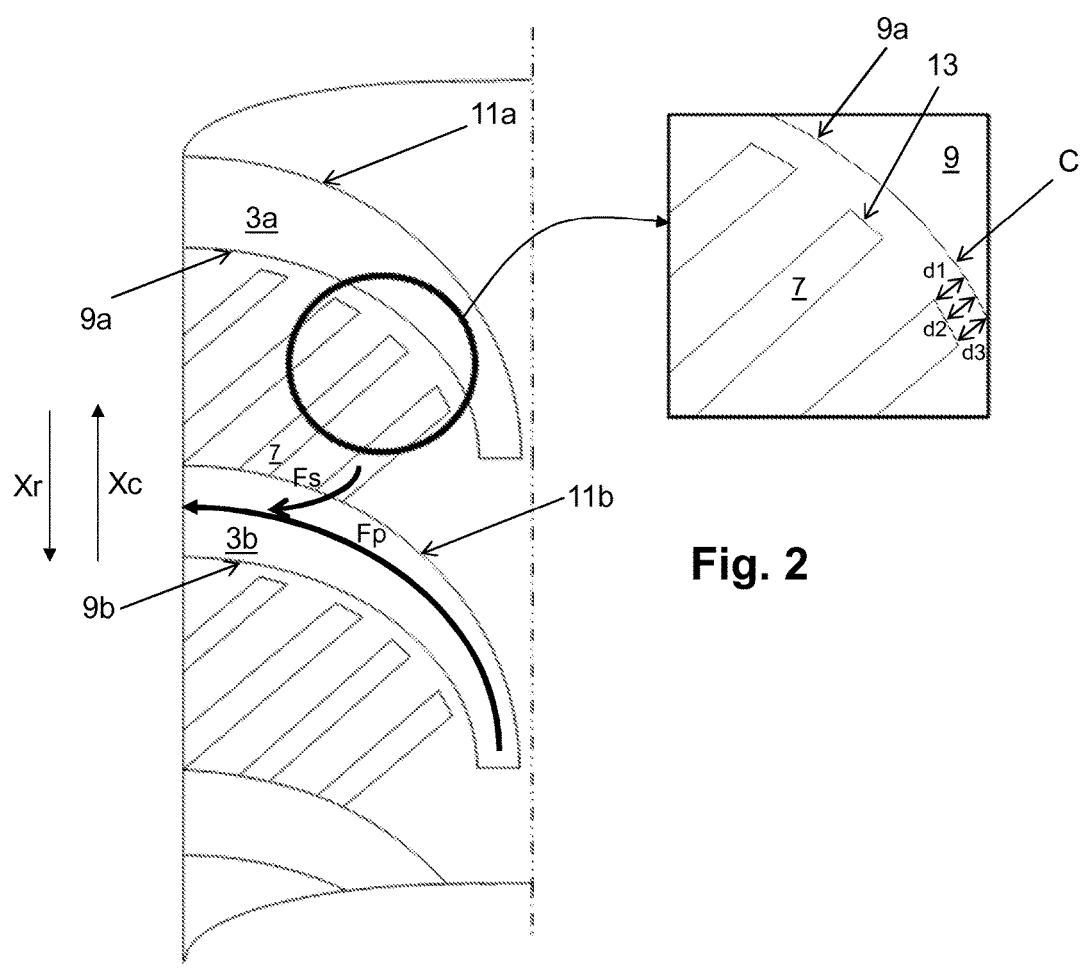
FIG. 2 depicts an enlarged view of part of the tread of FIG. 1 in the worn state.

FIG. 2 shows the state of the tread 1 when this tread reaches a certain degree of wear, for example, when the degree of wear of the tread reaches 20%. At this level of wear, the sipes become enlarged to form cavities 7. Each of these cavities opens into just one of the grooves 3a, 3b. These cavities 7 form a second pattern on the surface of the tread. This second pattern has the overall shape of a V and points in a cavity direction Xc.

In the embodiment illustrated in FIG. 2, the cavities 7 point in a direction Xc the opposite of the direction Xr of the grooves 3a, 3b and each cavity extends between the first wall 9a of a first groove 3a and the second wall of a second groove 3b adjacent to the first groove 3a. The cavity 7 opens then onto the second wall 11b of the second groove 3b but this cavity does not open onto the first wall 9a of the first groove 3a. Thus, a flow of water being removed from the cavity 7, referred to as a secondary flow Fs, will proceed in the same direction as a flow of water being removed from the grooves 3a, 3b and referred to as the main flow Fp.

Figure 5:
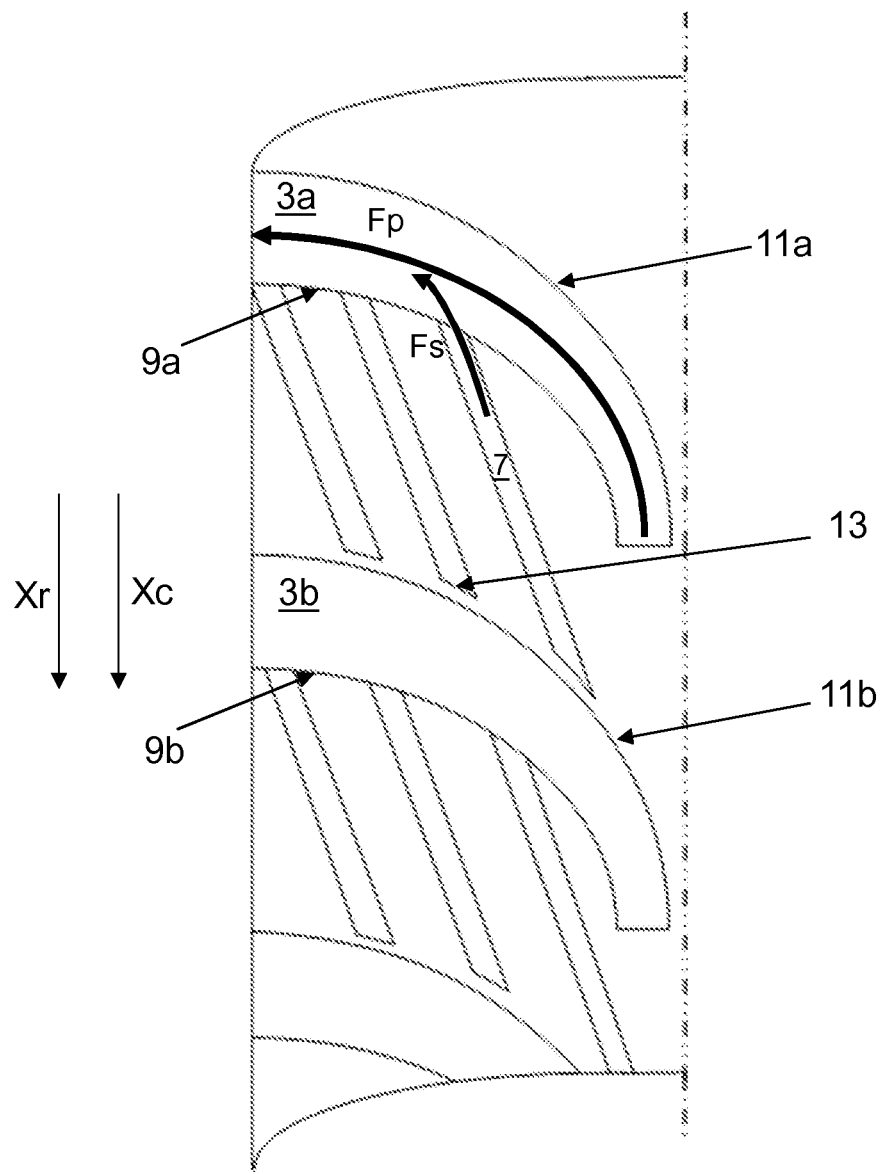
FIG. 5 depicts a partial view of a tread surface according to a fifth embodiment.

In another embodiment illustrated in FIG. 5, the cavities 7 point in a direction Xc parallel to the direction Xr of the grooves. These cavities 7 will therefore open onto the first wall 9a of the first groove 3a and these cavities 7 will not open onto the second wall 11b of the second groove 3b. Thus, the flows of water Fs being removed from the cavity 7 will proceed in the same direction as the flows of water Fp being removed from the grooves 3a, 3b.

FIG. 2 shows an enlargement at one end of a cavity 7, this end not opening into one of the grooves 3a, 3b. The cavity 7 at this end delimits a wall 13 facing the first wall 9a of the first groove. This wall has a shape on the tread surface of the tread which here is parallel to the curvature C of the first wall 9a. It will be noted that it is possible to measure the distances d1, d2, d3 between the first wall 9a and three points on the wall 13 which are respectively distributed at the ends of the wall 13 and the centre of this wall. The term "parallel" means that if the differences between the distances d1, d2, d3 are measured, the greatest of these differences needs to be less than 10% of the smallest distance d1, d2, d3.

The design that is mentioned hereinabove may also be applied to the walls 13 of the cavities 7 of FIG. 5.

Figure 3:
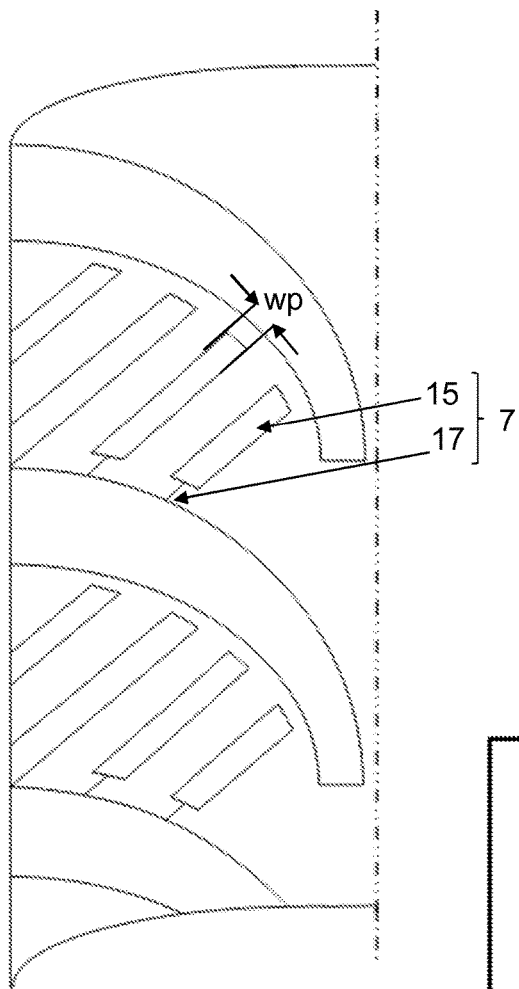
FIG. 3 depicts a partial view of a tread surface according to a third embodiment.

FIG. 3 is an alternative form of embodiment of the cavity 7 in which this cavity comprises a principal part 15 of width wp and an intermediate part 17 connecting the principal part 15 of this cavity to a groove. This intermediate part is depicted here in the form of a sipe.

Figure 4:
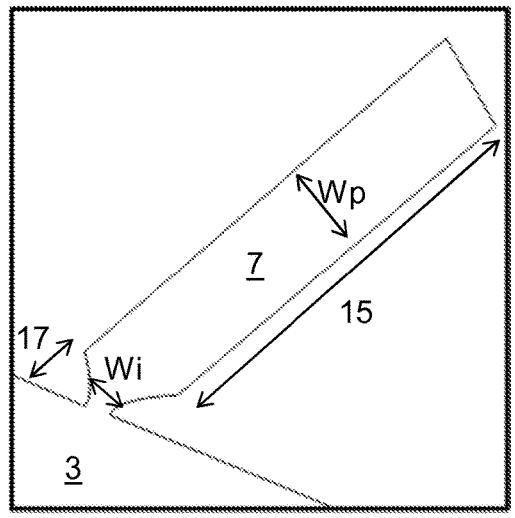
FIG. 4 depicts a partial view of a tread surface according to a fourth embodiment.

FIG. 4 is another alternative form of embodiment of the cavity 7 in which the intermediate part decreases progressively from the principal part of this cavity towards the groove.

The invention is not restricted to the examples described and depicted and various modifications can be made thereto without departing from its scope.

Thus, the principal direction in which the sipes extend is, as may be seen in FIG. 1, parallel overall to the direction in which the cavities that extend these sipes extend, as can be seen in FIG. 2. In other embodiments, it is possible for the principal direction in which the sipes extend to be angularly offset with respect to the principal direction in which the cavities extend.

Furthermore, the cavities are shown in the figures to have a rectangular overall shape. As an alternative, the cavity along its length has different shapes, such as curved shapes.

The invention claimed is:

1. A tread comprising:
a plurality of grooves which are formed on each half of the tread on each side of a midplane X-X', each of these grooves opening axially to the outside and extending axially towards the midplane X-X' so that the plurality of grooves forms on the tread a first pattern in the overall shape of a V pointing in a groove direction Xr,
a plurality of sipes wherein from a certain tread wear onwards, all or some of the sipes of this tread become enlarged in order to form cavities, wherein these cavities extend in an oblique direction, forming a second pattern in the overall shape of a V pointing in a cavity direction Xc, wherein each of these cavities opens into just one of the grooves of the tread, the plurality of grooves forming, at this level of wear, the same first pattern, and
wherein the grooves have a predetermined curvature on the tread surface of the tread, each groove delimiting a first wall of material on the inside of the curvature and a second wall of material opposite the first wall of material, wherein the cavity direction Xc is identical to the groove direction Xr, and wherein each cavity extends between the first wall of a first groove and the second wall of a second groove adjacent to the first groove, this cavity opening onto the first wall of the first groove and not opening onto the second wall of the second groove.

2. The tread according to claim 1, wherein the cavity delimits a wall respectively facing the first wall of the first groove or the second wall of the second groove, the shape of this wall on the tread surface being parallel respectively to the curvature of the first wall or parallel to the curvature of the second wall.

3. The tread according to claim 1, wherein the cavity comprises a principal part of width wp and an intermediate part of width wi less than the width wp of the principal part, this intermediate part connecting the principal part of the cavity to a groove.

4. The tread according to claim 3, wherein the width wi of the intermediate part of the cavity decreases progressively from the principal part of this cavity towards the groove.

* * * * *